(12) United States Patent
Onomura

(10) Patent No.: US 7,936,940 B2
(45) Date of Patent: May 3, 2011

(54) IMAGE PROCESSING METHOD AND DEVICE

(75) Inventor: Kenichi Onomura, Nishitokyo (JP)

(73) Assignee: Olympus Imaging Corp., Tokyo (JP)

( * ) Notice: Subject to any disclaimer, the term of this patent is extended or adjusted under 35 U.S.C. 154(b) by 1064 days.

(21) Appl. No.: 11/516,404

(22) Filed: Sep. 6, 2006

(65) Prior Publication Data

US 2007/0052812 A1   Mar. 8, 2007

(30) Foreign Application Priority Data

Sep. 8, 2005 (JP) .................................. 2005-260846

(51) Int. Cl.
*G06K 9/40* (2006.01)

(52) U.S. Cl. ........................................ 382/266; 382/260

(58) Field of Classification Search ................... 382/260, 382/266
See application file for complete search history.

(56) References Cited

U.S. PATENT DOCUMENTS

| | | | | |
|---|---|---|---|---|
| 5,056,524 A | * | 10/1991 | Oe | 600/431 |
| 5,134,667 A | * | 7/1992 | Suzuki | 382/164 |
| 5,231,677 A | * | 7/1993 | Mita et al. | 382/266 |
| 5,313,301 A | * | 5/1994 | Lee | 348/607 |
| 5,392,365 A | * | 2/1995 | Steinkirchner | 382/260 |
| 5,608,824 A | | 3/1997 | Shimizu | |
| 5,825,937 A | * | 10/1998 | Ohuchi et al. | 382/261 |
| 5,912,744 A | * | 6/1999 | Nakane | 358/447 |
| 6,373,992 B1 | * | 4/2002 | Nagao | 382/266 |
| 6,735,547 B1 | * | 5/2004 | Yfantis | 702/155 |
| 2003/0169941 A1 | * | 9/2003 | Lin et al. | 382/266 |
| 2005/0100239 A1 | * | 5/2005 | Boon et al. | 382/263 |

FOREIGN PATENT DOCUMENTS

| | | |
|---|---|---|
| CN | 1093968 C | 11/2002 |
| JP | 5-20140 | 3/1993 |
| JP | 9-022281 | 1/1997 |
| JP | 2000-312327 | 7/2000 |
| JP | 2001-209785 | 8/2001 |

OTHER PUBLICATIONS

Chinese Office Action to Chinese Patent Application No. 2006101514648, mailed Sep. 28, 2007 (5 pgs.), with translation (6 pgs.).
Notice of Reasons for Rejection for Japanese Patent Application No. 2005-260846, mailed Nov. 30, 2010 (2 pgs.) with translation (3 pgs.).

* cited by examiner

*Primary Examiner* — Samir A Ahmed
*Assistant Examiner* — Jayesh Patel
(74) *Attorney, Agent, or Firm* — Straub & Pokotylo; John C. Pokotylo

(57) ABSTRACT

In a method of processing digitized image data, first image data stored in a first area of a memory is subjected to a filtering process to produce second image data which has a peripheral portion of the first image data removed. The second image data and peripheral image data corresponding to the peripheral portion of the first image data which is removed through the filtering process are then combined into composite image data having substantially the same angle of view as the first image data.

8 Claims, 11 Drawing Sheets

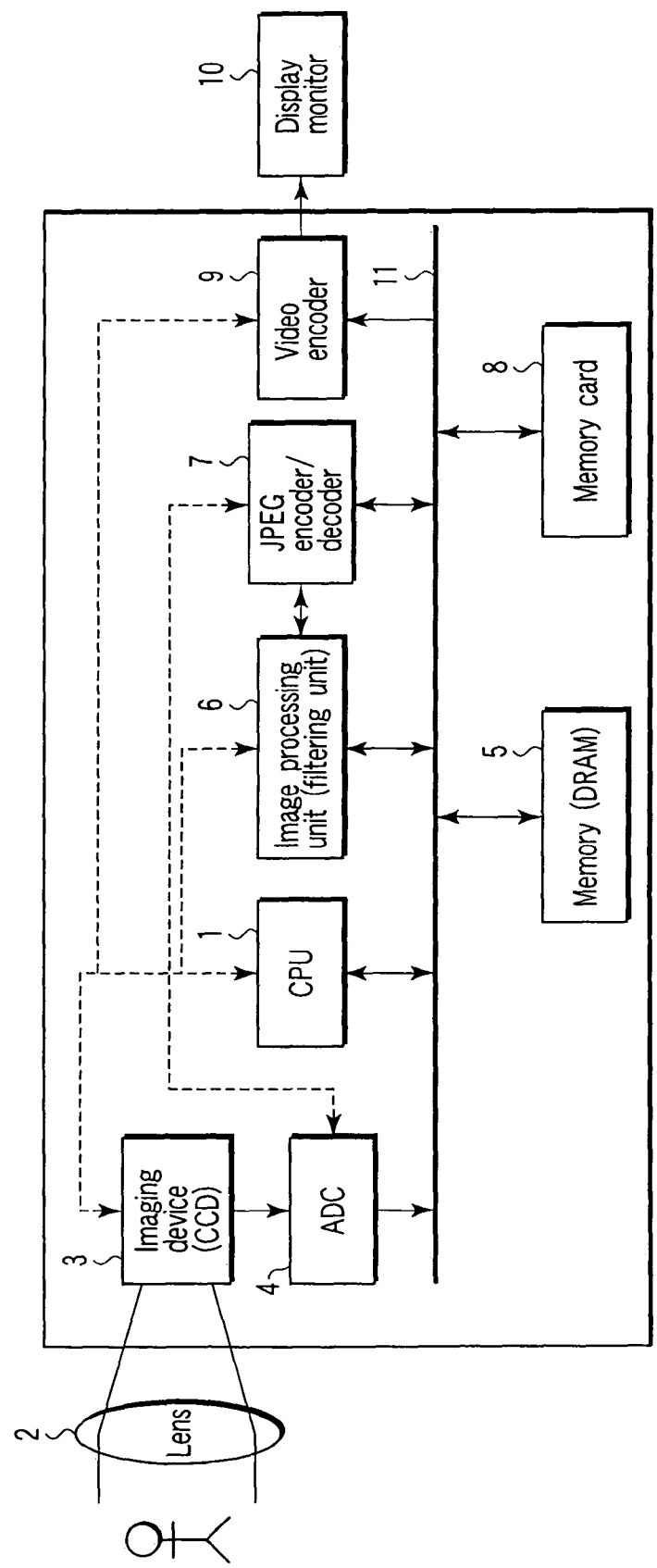
F I G. 1

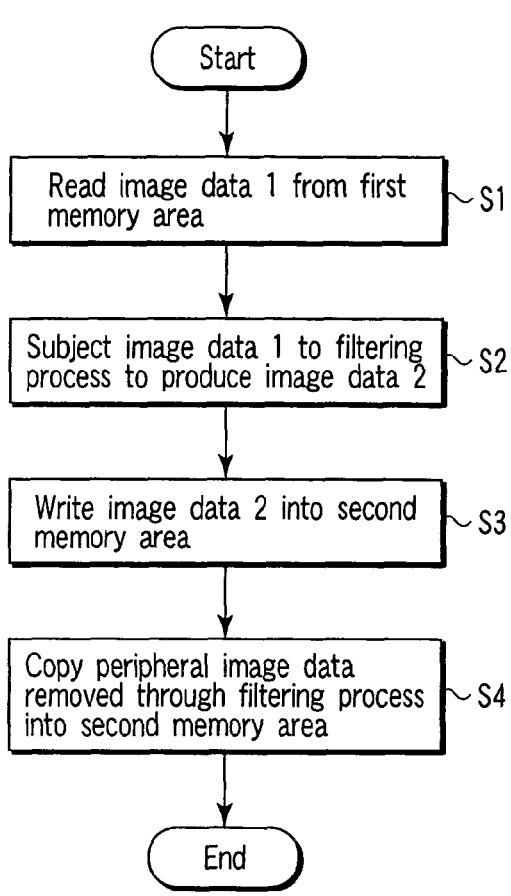
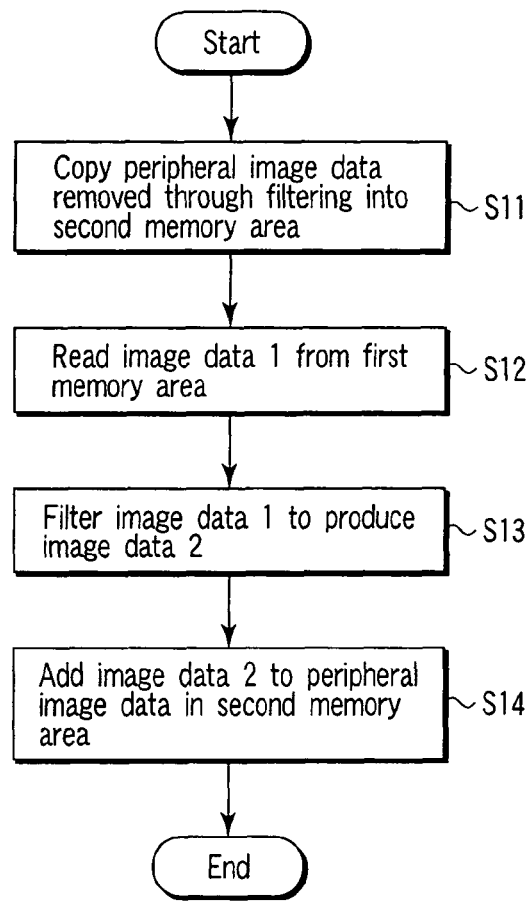
F I G. 4    F I G. 6

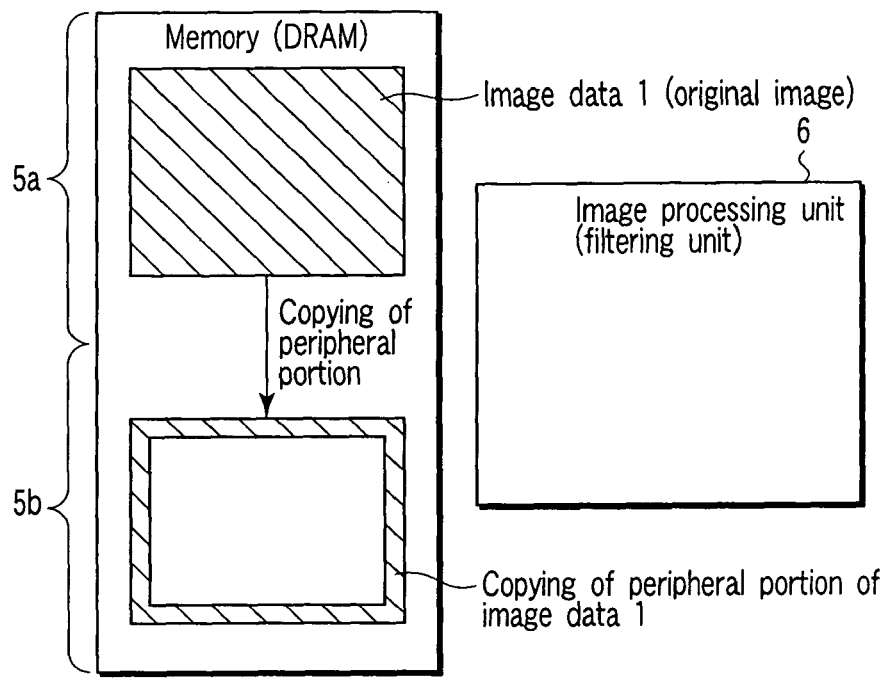
F I G. 7A
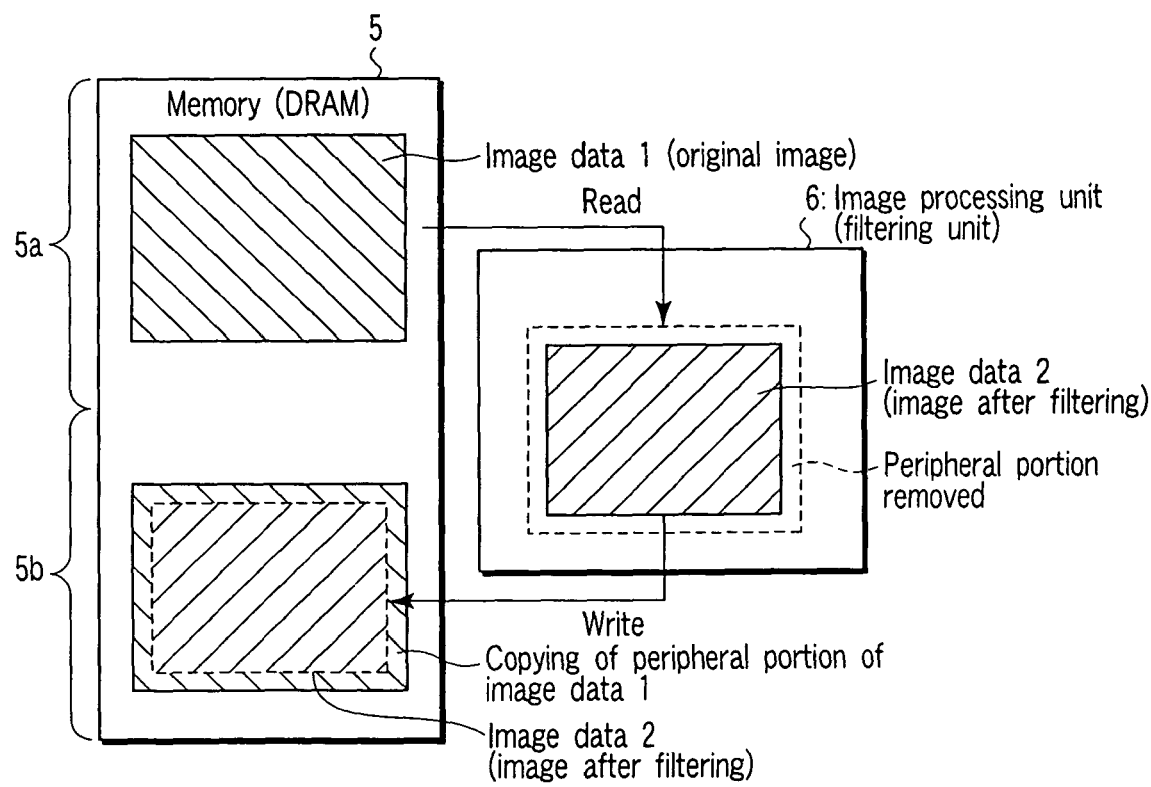
F I G. 7B

IMAGE PROCESSING METHOD AND DEVICE

CROSS-REFERENCE TO RELATED APPLICATIONS

This application is based upon and claims the benefit of priority from prior Japanese Patent Application No. 2005-260846, filed Sep. 8, 2005, the entire contents of which are incorporated herein by reference.

BACKGROUND OF THE INVENTION

1. Field of the Invention

The invention relates to an image processing method and device and more specifically to an image processing method and device for performing a process of filtering an image.

2. Description of the Related Art

Japanese Unexamined Patent Publication No. 2000-312327 discloses an image processing device configured such that two or more image processing units involving filtering are directly connected to a succeeding compression processing unit via buffers. With this image processing device, it is not required to transfer processing data to a storage device, such as a DRAM, in processing between the image processing units and the compression processing unit, allowing the amount of data transferred over a bus to be reduced.

BRIEF SUMMARY OF THE INVENTION

According to an aspect of the present invention, there is provided a method of processing digitized image data comprising: subjecting first image data stored in a first memory area of a memory to a filtering process to produce second image data; and combining the second image data and peripheral image data corresponding to a peripheral portion of the first image data which is removed through the filtering process into composite image data having substantially the same angle of view as the first image data.

According to another aspect of the present invention, there is provided a image processing device comprising: a memory which stores first image data; a filtering unit which subjects the first image data read from the memory to a filtering process to produce second image data; and an image combining unit which combines the second image data produced by the filtering unit and image data corresponding to a peripheral portion of the first image data which is removed through the filtering process into composite image data having substantially the same angle of view as the first image data.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic and block diagram representation of a digital camera containing an image processing device according to an embodiment of the present invention;

FIG. 4 is a flowchart illustrating a first example of the image processing method of the embodiment;

FIG. 6 is a flowchart illustrating a second example of the image processing method of the embodiment;

FIGS. 7A and 7B schematically show the image processing procedure shown in FIG. 6;

DETAILED DESCRIPTION OF THE INVENTION

Figure 2:
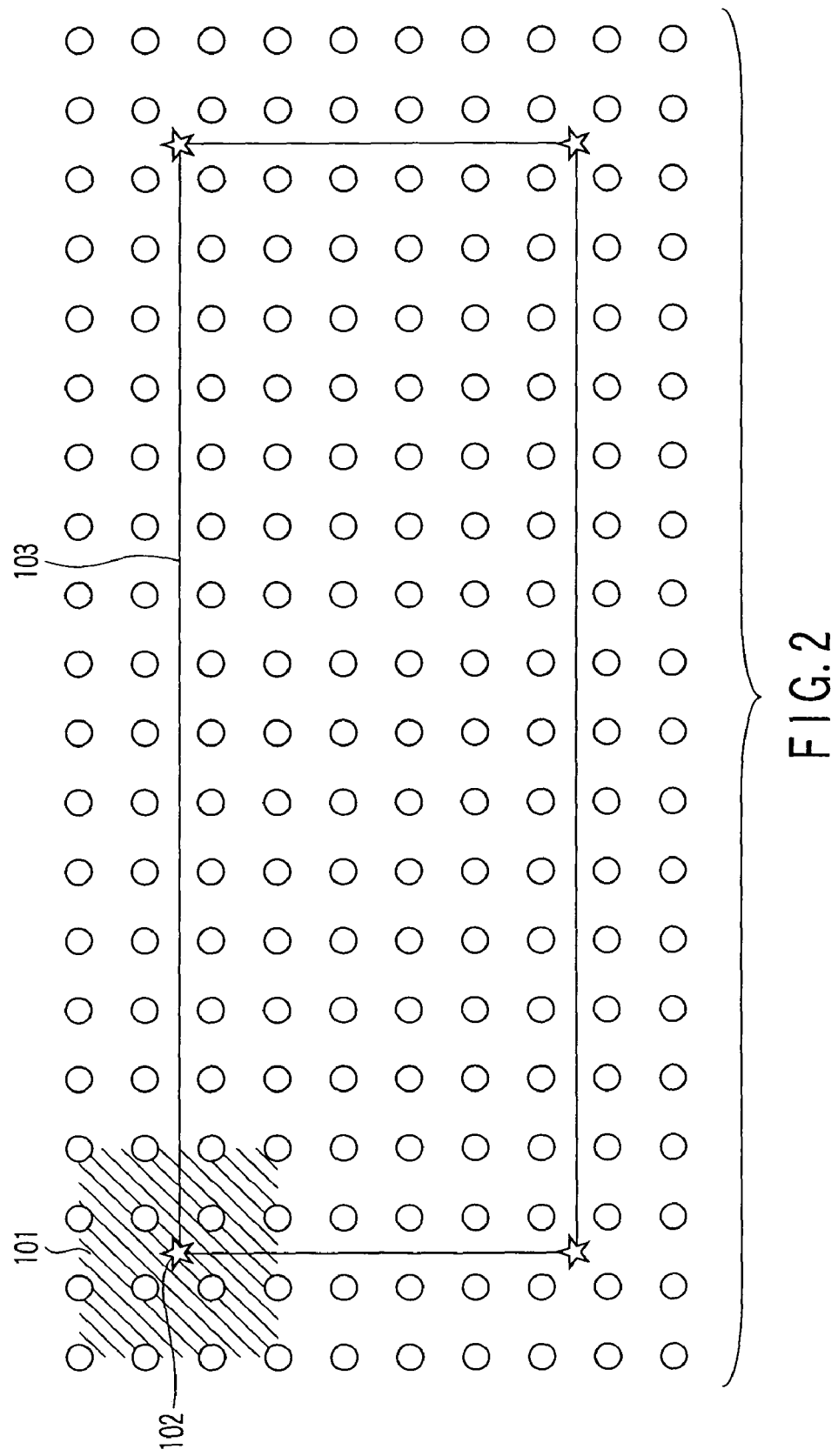
FIG. 2 is a conceptual diagram illustrating filtering of image data consisting of RGB signals in the image processing unit using a 4×4 center interpolation filter.

An embodiment of the present invention will be described hereinafter with reference to the accompanying drawings.

FIG. 1 is a schematic and block diagram representation of a digital camera containing an image processing device according to an embodiment of the present invention. The digital camera includes a CPU 1, an objective lens 2, an imaging device 3, an analog-to-digital converter (ADC) 4, a memory 5, an image processing unit 6, a JPEG encoder/decoder 7, a memory card 8, a video encoder 9, a display monitor 10, and a bus 11.

The CPU 1 controls each component of the digital camera shown in FIG. 1. For example, the CPU controls the operation of the imaging device 3 and the reading of an image signal from it. In addition, the CPU controls the operation of the ADC 4, the image processing unit 6, the JPEG encoder/decoder 7, and the video encoder 9.

The objective lens 2 causes an image of a subject not shown to be formed on the imaging device 3 such as a CCD image sensor. The imaging device 3 converts the optical image of the subject into an analog image signal. The image signal is read from the imaging device 3 under the control of the CPU 1 and then fed into the ADC 4 where the analog image signal is converted into a digital image signal. The digital image signal is output from the ADC 4 onto the bus 11. The memory 5 is comprised of, say, a DRAM, which stores the digital image signal (image data 1) output from the ADC 4 onto the bus 11 in its first memory area to be described later.

The image processing unit 6, serving as a filtering unit, performs image processing including filtering on the digital image signal read from the memory 5. At the time of recording an image, the JPEG encoder/decoder 7 encodes the image signal processed in the image processing unit 6 by means of a technique such as discrete cosine transformation (DCT). The encoded image signal from the JPEG encoder/decoder 7 is temporarily stored in the memory 5 and then recorded in the memory card 8 as a JPEG file with predetermined header information appended. At the time of reproducing the image, the JPEG encoder/decoder 7 reads the JPEG image signal from the memory card 8 and decodes it through a technique such as inverse DCT. The decoded image signal from the JPEG encoder/decoder 7 is reduced to a predetermined size adapted for display in the image processing unit 6 and is then temporarily stored in the memory 5. The video encoder 9 visually displays the image signal stored in the memory 5 on the display monitor 10.

Next, the image processing method of this embodiment using the image processing device of FIG. 1 will be described. First, a description is given of a process of filtering. FIG. 2 is a conceptual diagram illustrating filtering of image data consisting of RGB signals in the image processing unit 6 using a 4×4 center interpolation filter. The center interpolation filter is one used for determining data at the center by interpolating data at multiple points inside the filter (16 points in the case of a 4×4 filter). For example, the filter is used as a lowpass filter (LPF) to remove high-frequency components in an image signal, bandpass filter (BPF) to extract specific frequency components from an image signal, etc. Although FIG. 2 illustrates filtering of only one of the RGB signals, the same filtering process is performed on the other signal components. In addition, a description similar to the following description can be applied to YC signals as well.

In the case of a 4×4 filter, 16 points must be contained within it to allow for filtering. Therefore, a filter used for filtering of RGB signals has a shape as indicated at 101 in FIG. 2. As the result of filtering by the filter 101, data at the center of the filter 101 is obtained through interpolation. For example, filtering at the upper left of FIG. 2 allows data at point 102 to be obtained through interpolation. By performing such a filtering process on all the areas of an image, data at points in an area 103 are obtained. As indicated by the area 103, data at all the points in the filter cannot be obtained through interpolation by means of filtering, producing areas to which interpolation cannot be applied in the peripheral portion of the image. The size of the peripheral portion varies according to the numbers of samples of a signal to be processed, the type of a filter used for the process of filtering, the number of times the filtering process is performed, etc. In any case, the angle of view of an image after filtering becomes smaller than that before filtering.

Figure 3A:
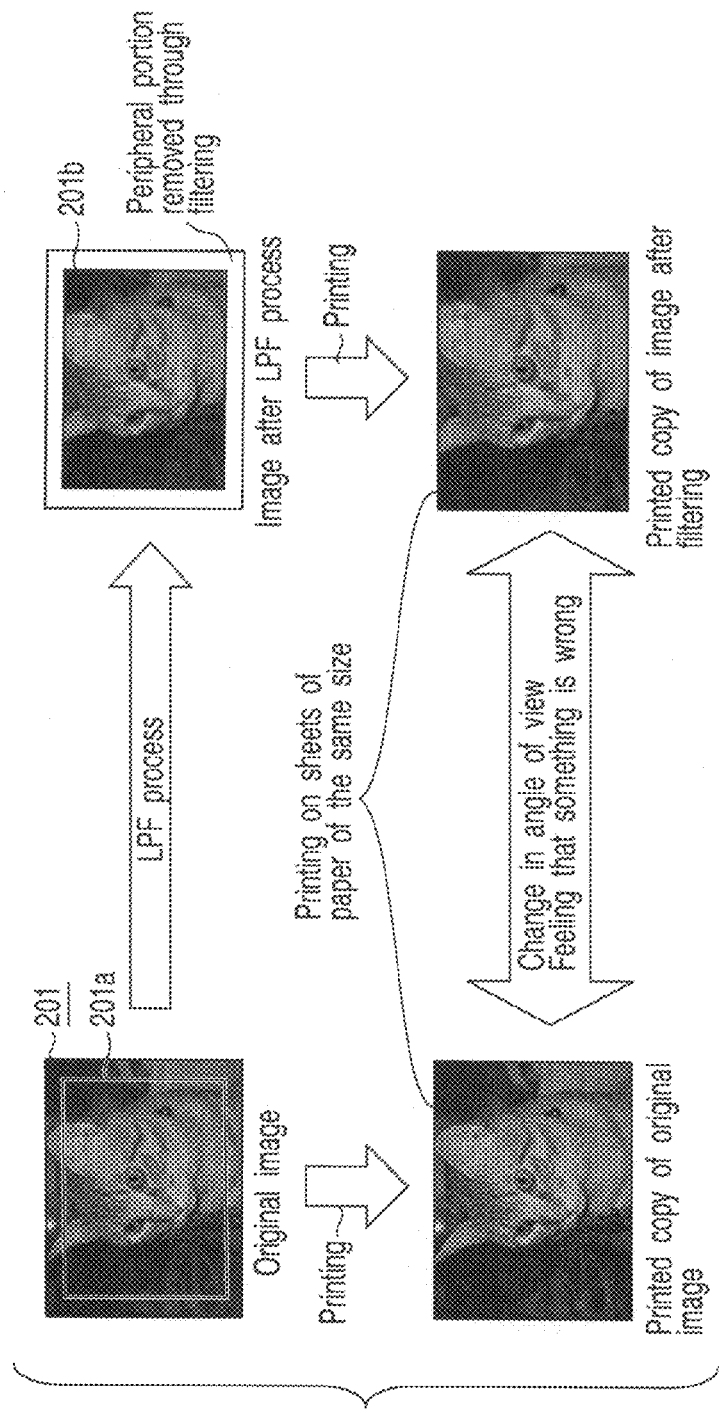
FIG. 3A shows images before and after a conventional filtering process.

For example, if an image 201 shown in FIG. 3A is subjected to a process of filtering (e.g., by an LPF), an image 201b will be obtained in which the original image 201 has its peripheral image portion 201a removed. When the images 201 and 201b are printed on sheets of paper of the same size, the printed images differ in angle of view from each other because the angle of view of the image 201b has changed from that of the original image 201. This will give users a feeling that something is wrong.

Figure 3B:
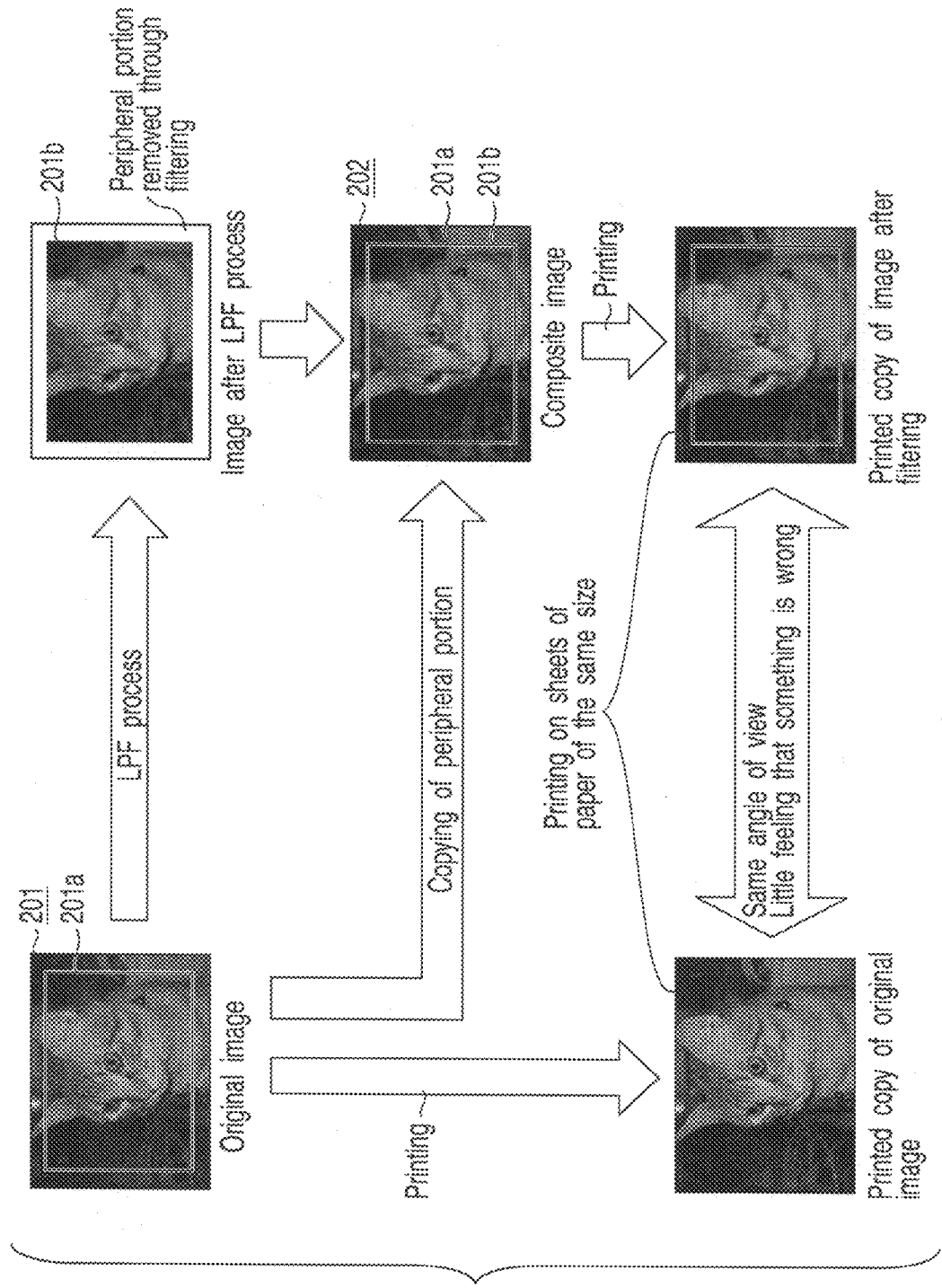
FIG. 3B shows images before and after a filtering process according to an embodiment of the present invention.

To solve such a problem, this embodiment is configured to perform a process of filtering using an approach as will be described with reference to FIG. 3B. By subjecting the original image 201 to a filtering operation, the image 201b is obtained in which the peripheral image portion 201a of the original image 201 has been removed. With this embodiment, after filtering, the image 201b and the peripheral image portion 201a removed through filtering are combined into an image 202 so as to make the angle of view of the image 201b after filtering coincide with that of the original image 201. By producing such a composite image 202, the angle of view of the image after filtering is made to coincide with that of the original image, allowing users to feel that nothing is wrong.

Next, the image processing method of this embodiment will be described more specifically. FIG. 4 is a flowchart illustrating a first example of the image processing method of this embodiment.

In FIG. 4, the image processing unit 6 first reads original image data before filtering (image data 1) from a first memory area of the memory 5 (step S1), then produces image data after filtering (image data 2) by performing a filtering process on the read image data 1 (step S2) and writes the image data 2 into a second memory area of the memory 5 (step S3).

After the image data 2 has been written into the second memory area in step S3, a DMA circuit not shown reads from the first memory area peripheral image data corresponding to a peripheral portion of the original image removed as the result of filtering and then writes the read peripheral image data into the second memory area so that the peripheral image data is copied onto the periphery of the image data 2 (step S4). Thus, the process of filtering is completed.

Figure 5A:
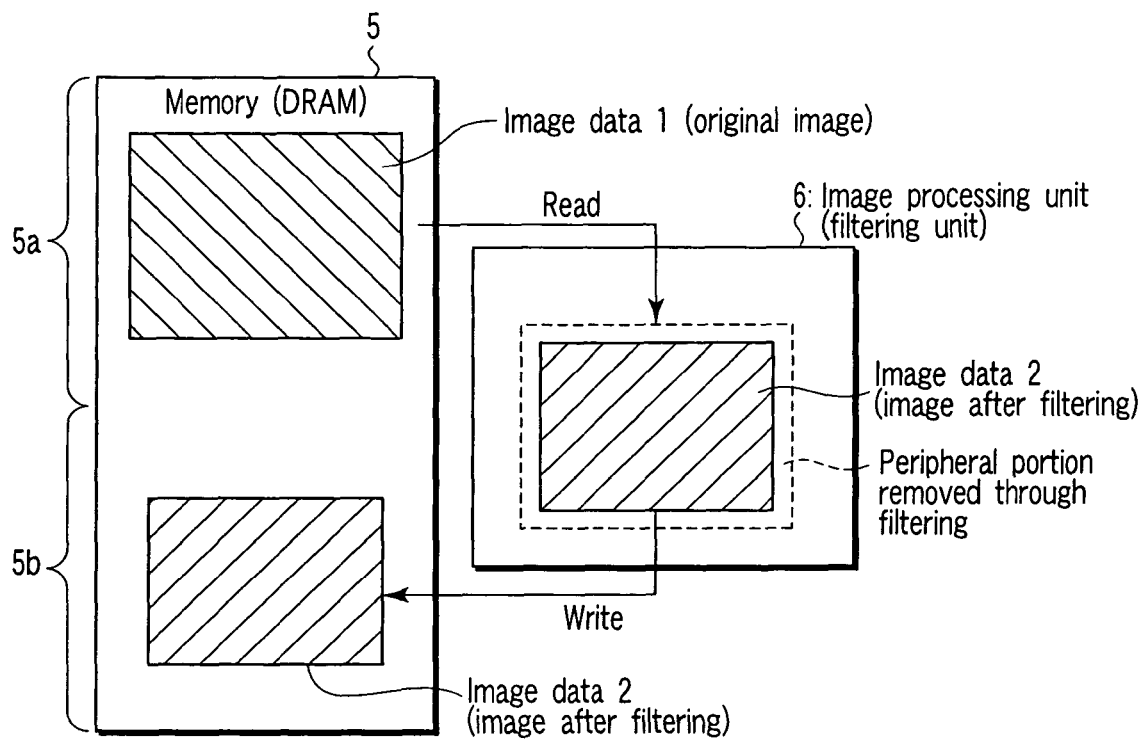
FIGS. 5A and 5B schematically show the image processing procedure shown in FIG. 4.
Figure 5B:
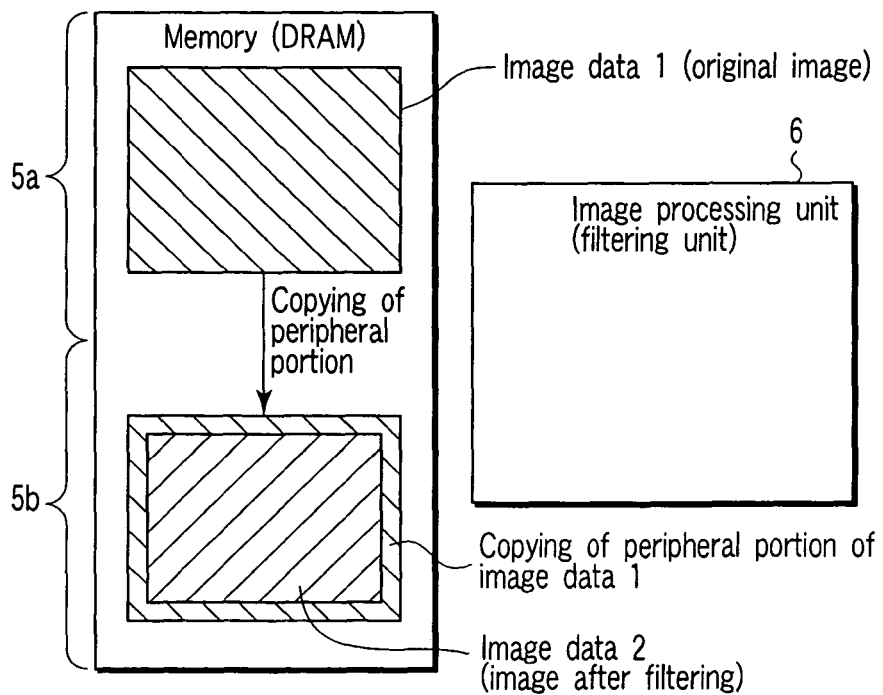

FIGS. 5A and 5B schematically show the image processing procedure shown in FIG. 4. As shown in FIG. 5A, the memory 5 in the first example has at least a first memory area 5a and a second memory area 5b. Image data (image data 1) obtained in the ADC 4 is written into the first memory area 5a of the memory 5 over the bus 11. When the image data 1 is read and then subjected to a filtering process by the image processing unit 6, image data corresponding to a peripheral portion of the original image is removed and consequently the angle of view varies as described previously. The image data 2 obtained through the filtering process is written into the second memory area 5b of the memory 5 which differs from the first memory area 5a.

After that, as shown in FIG. 5B, the peripheral image data of the original image data 1 is copied onto the periphery of the image data 2 written into the second memory area 5b to produce composite image data. Thus, the angle of view of the resulting composite image data is made identical to the angle of view of the original image data.

To copy the peripheral data of the image data 1, for example, image data are simply read from only peripheral ones of those locations in the first memory area 5a which are stored with the image data 1 and then written into those locations in the second memory area 5b which surround the locations where the image data 2 is stored.

In writing the image data 2 after filtering into the memory area 5b of the memory 5 in step S3, the starting location of the locations to store the image data 2 may be displaced so that peripheral image data can be copied.

FIG. 6 is a flowchart illustrating a second example of the image processing method of this embodiment. In the second example, the peripheral image data which is removed upon filtering is copied into the second memory area prior to filtering.

In FIG. 6, the DMA circuit not shown reads, under the control of the CPU 1, only peripheral image data expected to be removed by filtering from the original image data before filtering (image data 1) written into the first memory area of the memory 5 and then copies it into the second memory area (step S1). After the peripheral image data has been copied, the image processing unit 6 reads the image data 1 from the first memory area of the memory 5 (step S12) and then produces image data after filtering (image data 2) by filtering the read image data 1 (step S13). After filtering, the image processing unit 6 writes the image data 2 into the second memory area of the memory 5 so that the image data 2 obtained by filtering is fitted into the peripheral image data written in advance into the second memory area (step S14). Thus, the filtering process is completed.

FIGS. 7A and 7B schematically show the image processing procedure shown in FIG. 6. In the second example, as in the first example, the memory 5 has at least a first memory area 5a and a second memory area 5b as shown in FIG. 7A. The image data obtained in the ADC 4 is written into the first memory area 5a of the memory 5 over the bus 11. The peripheral image data expected to be removed by filtering is read from the image data 1 and then copied into the second memory area 5b.

Which portion of the image data 1 the peripheral image data expected to be removed corresponds to is determined by the number of samples of image data, the type of filter used for filtering, the number of times the filtering process is performed, etc.

After the peripheral image data has been copied into the second memory area, the image data 1 is read and then subjected to a filtering process by the image processing unit 6, whereby the image data 2 is obtained. After that, as shown in FIG. 7B, the image data 2 is copied onto the inside of the peripheral image data written into the second memory area 5b. Thus, the angle of view of the composite image data thus obtained becomes identical to that before filtering.

Figure 8:
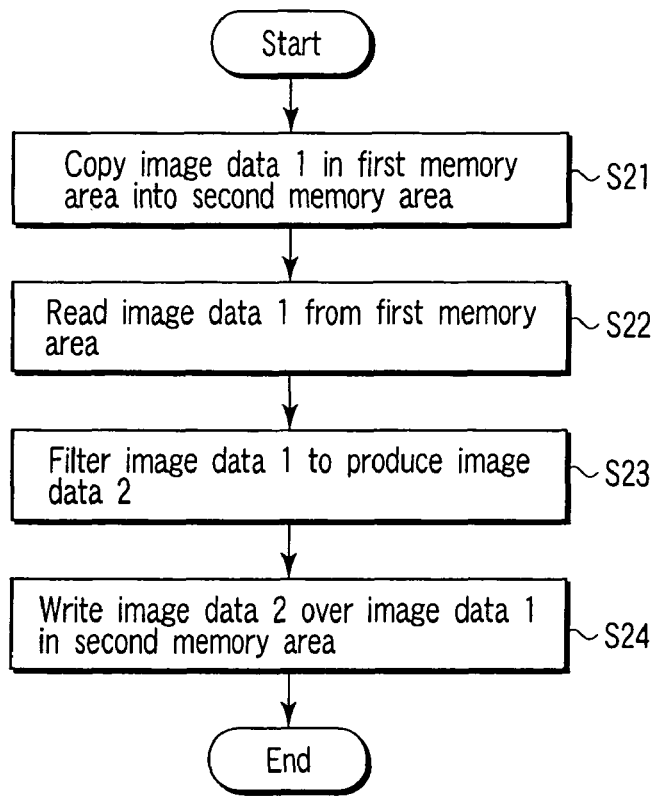
FIG. 8 is a flowchart illustrating a third example of the image processing method of the embodiment in which image data 2 overwrites image data 1 written into the second memory area.
Figure 9:
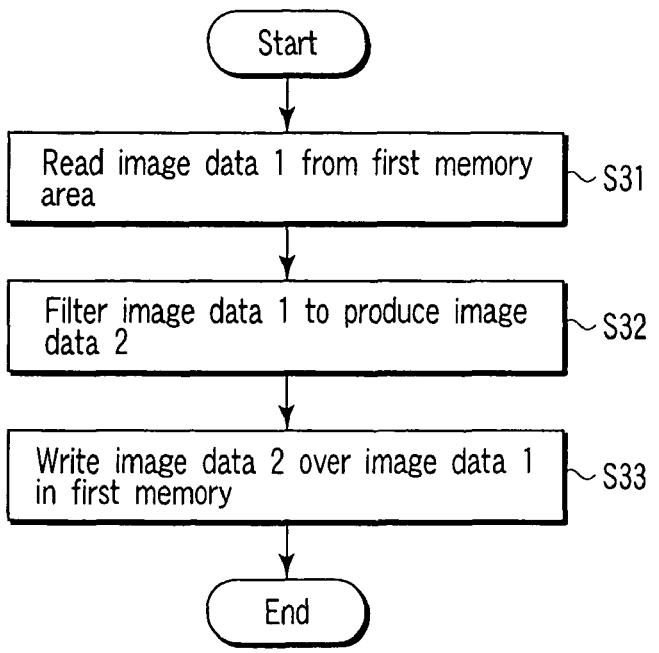
FIG. 9 is a flowchart illustrating the third example of the image processing method of the embodiment in which image data 2 overwrites image data 1 written into the first memory area.

FIGS. 8 and 9 are flowcharts illustrating a third example of the image processing method of this embodiment. In the third example, the image data 2 overwrites the image data 1 to thereby add peripheral image data to the periphery of the image data 2. FIG. 8 shows an example of writing the image data 2 over the image data 1 written into the second memory area, and FIG. 9 shows an example of writing the image data 2 over the image data 1 written into the first memory area.

First, as shown in FIG. 8, the DMA circuit not shown copies all the original image data (image data 1) written into the first memory area of the memory 5 into the second memory area under the control of the CPU 1 (step S21). After that, the image processing unit 6 reads the image data 1 from the first memory area of the memory 5 (step S22). The image processing unit 6 subjects the read image data 1 to a filtering process to produce image data after filtering (image data 2) (step S23). After the process of filtering, the image processing unit 6 writes the image data 2 produced through filtering over the image data 1 written into the second memory area (step S24). Thus, the process of filtering is completed. The overwriting is performed in such a way that the peripheral image data to be removed through filtering is left around the image data 2.

In the example of FIG. 9, the image processing unit 6 reads the original image data before filtering (image data 1) written into the first memory area of the memory 5 (step S31) and then subjects the read image data 1 to a filtering process to produce image data after filtering (image data 2) (step S32). After the process of filtering, the image processing unit 6 writes the image data 2 produced through filtering over the image data 1 written into the first memory area (step S33). Thus, the process of filtering is completed. The overwriting is performed in such a way that the peripheral image data of the image data 1 is left.

Figure 10A:
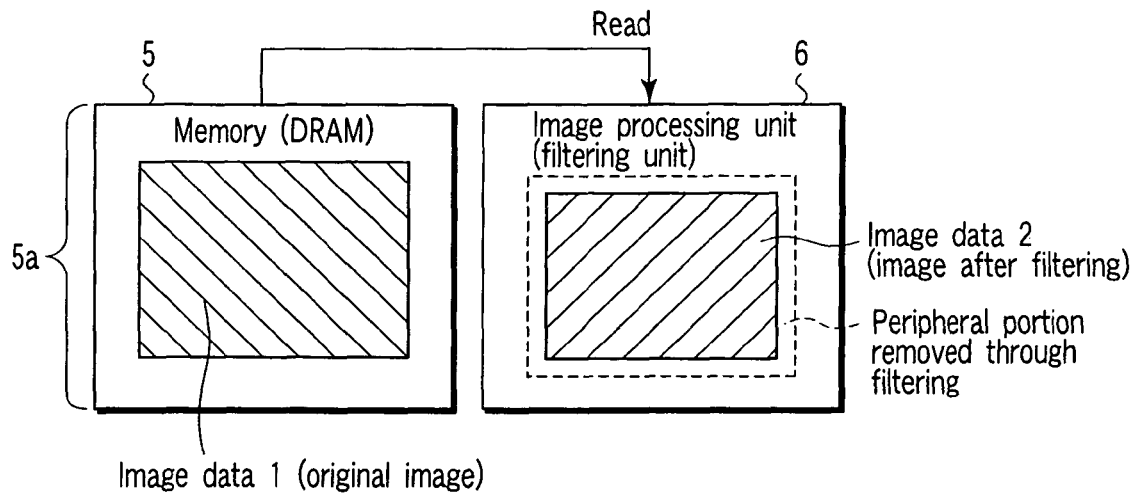
FIGS. 10A and 10B schematically show the image processing procedure shown in FIG. 9.
Figure 10B:
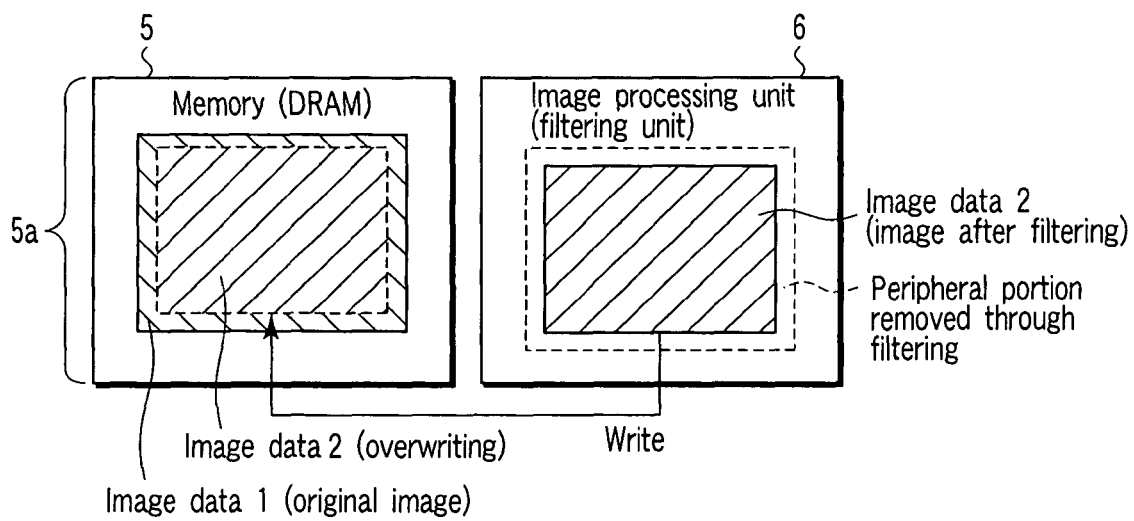

FIGS. 10A and 10B schematically show the image processing procedure shown in FIG. 9. As shown in FIG. 10A, the memory 5 in the example of FIG. 9 is only required to have the first memory area 5a alone. The image data 1 obtained by the ADC 4 is stored over the bus 11 into the first memory area 5a of the memory 5. After that, the image processing unit 6 reads the image data 1 and subjects it to a process of filtering to produce the image data 2. Then, as shown in FIG. 10B, the image data 2 overwrites the image data 1 written into the first memory area 5a so that peripheral image data of the image data 1 is left. The angle of view of the composite image data thus obtained becomes identical to that before filtering.

Figure 11A:
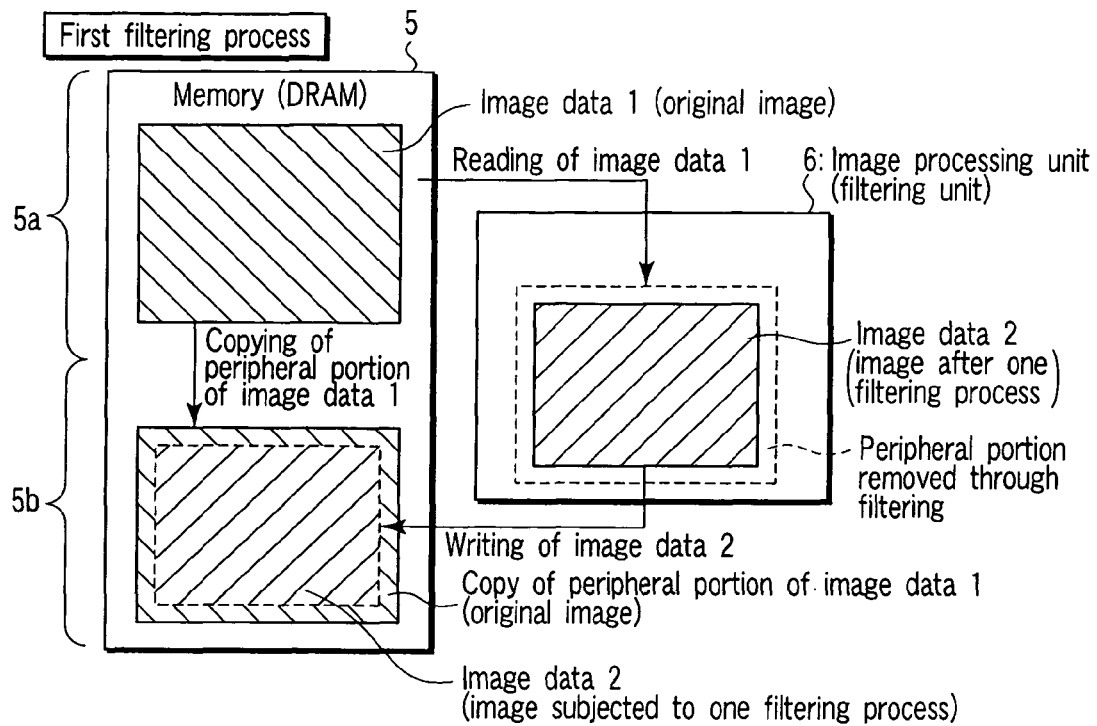
FIGS. 11A, 11B and 11C are diagrams for use in explanation of a case where a filtering process is performed several times.
Figure 11B:
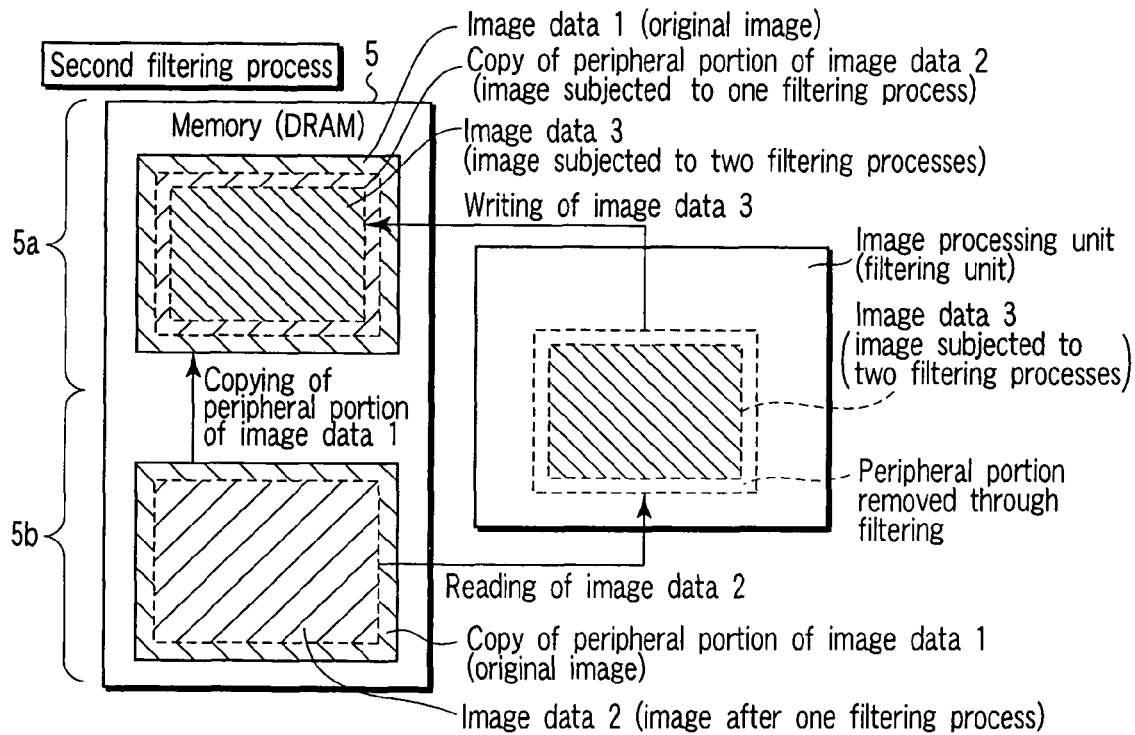

Next, a case where the process of filtering is performed several times will be described with reference to FIGS. 11A, 11B, and 11C. The first example of filtering will be described here. As for the second and third examples, the concept of several processes of filtering by itself remains unchanged because they differ from the first example only in the method of producing composite image data.

First, the first process of filtering is performed in the manner described in conjunction with FIGS. 4, 5A, and 5B. That is, the image data 1 written into the first memory area 5a of the memory 5 is read and then filter-processed by the image processing unit 6. The image data 2 thus obtained is written into the second memory area 5b. After that, peripheral image data corresponding to a portion removed upon filtering is copied onto the periphery of the image data 2 (see FIG. 11A).

In the second process of filtering, of the composite image data written into the second memory area 5b, image data corresponding to the image data 2 (composite image data minus peripheral image data) is read and then filter-processed by the image processing unit 6. Image data 3 thus produced (smaller in angle of view than the image data 2) is written into the first memory area 5a of the memory 5. After that, peripheral image data corresponding to a portion removed through the second filtering process is copied onto the periphery of the image data 3 (see FIG. 11B).

In the subsequent processes, of composite image data obtained through the last process, image data obtained through the last (e.g., the [n−1]st) filtering process is read and then subjected to the n-th filtering process. Peripheral image data corresponding to a portion removed through this (n-th) filtering process is then copied onto the periphery of image data obtained through this filtering process (see FIG. 11C).

Figure 11C:
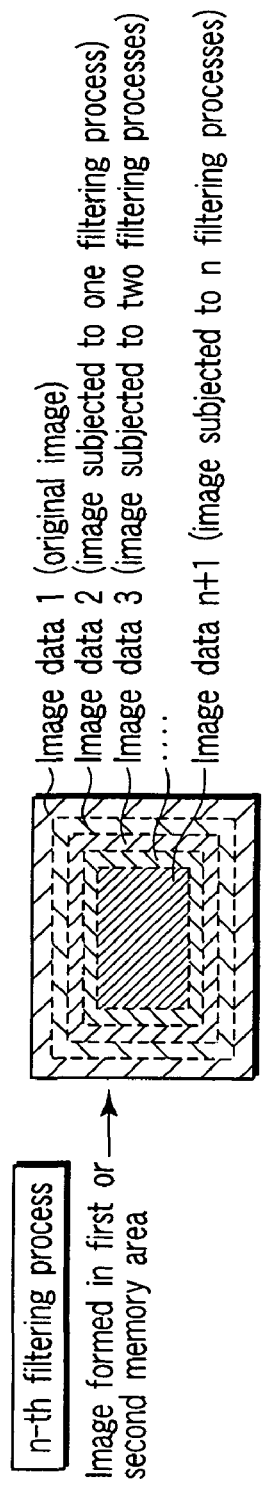

Here, the image data after the n-th filtering process shown in FIG. 11C contains image data subjected to a desired number (n) of filtering processes at its center. Image data on the outside has been subjected to a smaller number of filtering processes than image data on the inside. The boundary between an image subjected to n filtering processes and an image subjected to no filtering process (original image) would be conspicuous. With image data shown in FIG. 11C, however, each image connects to the adjacent image smoothly and naturally because the degree of filtering changes gradually like gradations.

As described above, the embodiment of the present invention allows image data before and after filtering to have the same angle of view by producing combined image data of peripheral image data removed upon filtering and image data after filtering.

Although the embodiment has been described in terms of an application of the image processing device to a digital camera, the principles of the invention are also applicable to common image processing devices involving filtering. In addition, for the process of filtering, the use of such a center interpolation filter as described above is not restrictive. The technique described above is applicable to a filtering process based on a weighting filter used for expansion or reduction.

The image processing device may be configured such that the CPU 1 stores programs for the procedures shown in FIGS. 4, 6, 8, and 9 and executes the programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of processing digitized image data comprising:
   subjecting first image data stored in a first memory area of a memory to a first filtering process to produce second image data;
   combining the second image data and peripheral image data corresponding to a peripheral portion of the first image data which is removed through the filtering process into first composite image data having substantially a same angle of view as the first image data;
   subjecting the second image data to a second filtering process to produce third image data; and
   combining, (1) the third image data, (2) peripheral image data corresponding to a peripheral portion of the second image data which is removed through the second filtering process, and (3) the peripheral image data corresponding to a peripheral portion of the first image data which is removed through the first filtering process, into second composite image data having substantially a same angle of view as the first image data.

2. The image processing method according to claim 1, further comprising storing the second image data into a second memory area different from the first memory area, and wherein the first composite image data is produced by copying the peripheral image data onto the periphery of the second image data stored in the second memory area.

3. The image processing method according to claim 1, further comprising copying the peripheral image data corresponding to the peripheral portion of the first image data which was removed through the first filtering process into a second memory area different from the first memory area before producing the second image data, and wherein the first composite image data is produced by adding the second image data produced to the peripheral image data copied into the second memory area.

4. The image processing method according to claim 1, further comprising copying the first image data into a second memory area different from the first memory area before producing the second image data, and wherein the first composite image data is produced by writing the second image data produced over the first image data copied into the second memory area.

5. The image processing method according to claim 1, wherein the first composite image data is produced by writing the second image data produced over the first image data stored in the first memory area so as to leave that image data of the first image data which corresponds to a peripheral portion which is to be removed through the first filtering process.

6. The image processing method according to claim 1, wherein each of the first filtering process and the second filtering process includes at least one of a lowpass filtering process, a bandpass filtering process, and an expansion/reduction process.

7. An image processing device comprising:
   a memory which stores first image data;
   a filtering unit which subjects the first image data read from the memory to a first filtering process to produce second image data;
   an image combining unit which combines the second image data produced by the filtering unit and image data corresponding to a peripheral portion of the first image data which is removed through the filtering process into first composite image data having substantially a same angle of view as the first image data;
   subjecting the second image data to a second filtering process to produce third image data; and
   combining, (1) the third image data, (2) peripheral image data corresponding to a peripheral portion of the second image data which is removed through the second filtering process, and (3) the peripheral image data corresponding to a peripheral portion of the first image data which is removed through the first filtering process, into a second composite image data having substantially a same angle of view as the first image data.

8. The image processing method according to claim 1, further comprising:
   storing the second composite image data in the first memory area.

* * * * *